(No Model.)
G. FRANKLIN.
COMBINED PLOW AND PLANTER.
No. 600,416. Patented Mar. 8, 1898.
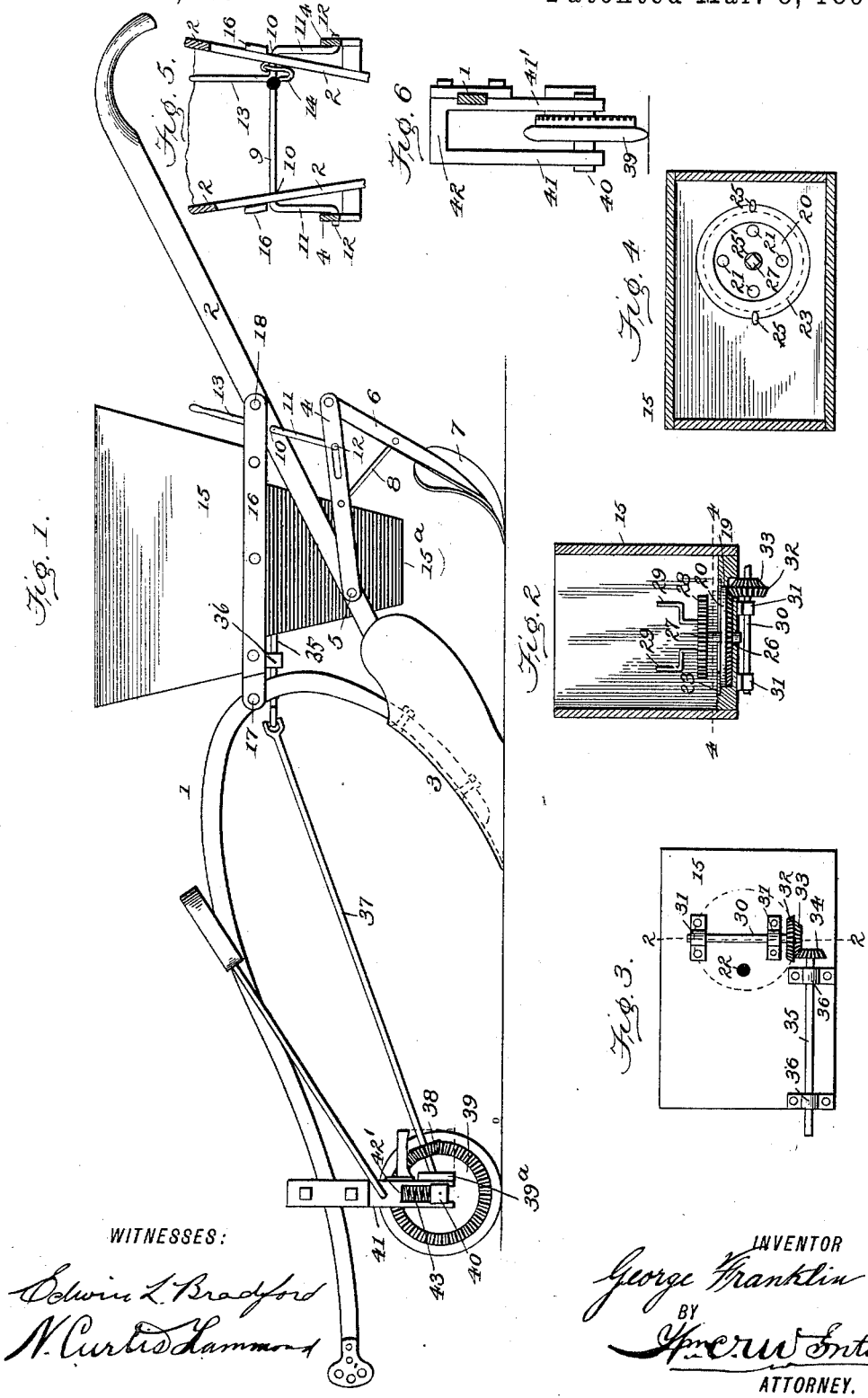
WITNESSES:
Edwin L. Bradford
N. Curtis Lammons
INVENTOR
George Franklin
BY
[signature]
ATTORNEY.

UNITED STATES PATENT OFFICE.

GEORGE FRANKLIN, OF SAN MARCOS, TEXAS.

COMBINED PLOW AND PLANTER.

SPECIFICATION forming part of Letters Patent No. 600,416, dated March 8, 1898.

Application filed February 27, 1897. Serial No. 625,353. (No model.)

*To all whom it may concern:*

Be it known that I, GEORGE FRANKLIN, a citizen of the United States, residing at San Marcos, in the county of Hays and State of Texas, have invented certain new and useful Improvements in a Combined Plow and Planter; and I do hereby declare the following to be a full, clear, and exact description of the invention, such as will enable others skilled in the art to which it appertains to make and use the same.

My invention relates to certain new and useful improvements in combined plows and planters, and has more particular reference to that class wherein the plow turns the furrow and the seed is automatically dropped and afterward covered by suitable turn-shovels or covering-plows.

My invention has for its object to provide a plow and planter of this general character which can be readily adapted for planting different kinds of seed, such as corn, cotton, cane, and the like.

A further object is to provide means whereby the seed may be automatically dropped as the plow turns the furrow.

A further object is to provide means for covering the seed after it has been dropped.

A further object is to provide means whereby the turn-shovels or covering-plows may be held up out of contact with the earth, or, together with the hopper, removed entirely in order that the plow may be used for plowing purposes alone.

A further object is to provide for the ready interchangeability of the seed-plates in order to adapt the planter to different kinds of seed; and with these ends in view my invention consists in the details of construction and combinations of parts to be more fully hereinafter described.

Referring to the accompanying drawings, Figure 1 is a side elevation of a combined plow and planter embodying my invention. Fig. 2 is a section of the hopper, taken on the line 2 2, Fig. 3. Fig. 3 is a bottom plan view of the hopper with the delivery-spout removed. Fig. 4 is a section on the line 4 4, Fig. 2. Fig. 5 is a rear view, partly in section, showing the manner of raising the turn-shovels or covering-plows and means for holding them up. Fig. 6 is a detail view showing the manner of fastening the ground-wheel frame to the beam or standard.

Similar numerals indicate like parts in the several figures.

1 represents the plow beam or standard, to which are secured suitable handles 2.

3 represents the plow, which is adapted to be detachably secured to the standard in any suitable manner in order that it may be readily removed and a different style substituted.

4 4 designate arms, which are pivotally attached at 5 to the handles 2. To the rear ends of these arms 4 are pivotally attached downwardly-extending arms or extensions 6 6, to which are secured the turn-shovels or covering-plows 7 7. These turn-shovels or plows may be detachably secured to the arms or extensions 6, if thought desirable. The arms 4 and 6 are strengthened and braced by means of rods 8.

The shovels 7 are set at such an angle with reference to the plow 3 that when a double moldboard is used they turn the earth back into the furrow after the seed has been dropped from the hopper.

To enable the turn-shovels or covering-plows to be thrown up out of position when desired, I provide the following means: 9 is a rod or shaft passing through the handles at 10 and having its ends bent downward at 11 and then outward, as shown at 12, these outwardly-bent portions 12 passing through the arms 4 in an obvious manner. This rod or shaft is also provided with a lever 13 for rotating said shaft, so as to either raise or lower the turn-shovels or plows. When they have been raised, a locking hook or bail 14, attached to one of the handles 2, engages with the lever 13 and securely holds the same.

15 is a hopper or seed-receptacle which is supported by means of straps or bands 16, attached to the beam or standard at 17 and to the handles at 18. To the under side of this hopper is attached an outlet-spout 15$^a$. The bottom of the hopper 15 is cut away at 19 and has mounted therein a seed-plate 20. This plate is provided on its under side with bevel-teeth, as clearly shown, and is further provided with openings 21 for the passage of the seed, arranged at suitable distances apart, which successively register with the discharge-opening 22 in the bottom of the hopper. The seed-plate 20 is securely held in position against upward movement by means of a ring 23 of a slightly-larger diameter than said plate, and this ring is fastened by means of hooks 25. These hooks are adapted to turn sidewise, so that the ring and plate can be readily removed when it is desired to substitute a seed-plate with holes of a different size. The seed-plate is further provided with a central opening 25', which registers with an opening 26 in the bottom of the hopper and through which passes a shaft 27. To the upper end of this shaft 27 is secured a separator or spreader 28 for separating the seeds. This separator is notched or provided with teeth on its periphery to more thoroughly separate the seed, and is further provided with arms 29 for a similar purpose.

30 represents a shaft supported in suitable brackets or journal-supports 31 on the under side of the hopper. This shaft carries a bevel-pinion 32, which engages through an opening in the bottom of the hopper with the bevel-teeth on the under side of the seed-plate 20, and is also provided with a bevel-pinion 33, which meshes with a bevel-pinion 34 on one end of a short shaft 35. This shaft 35 is also supported in brackets or journal-supports 36 on the under side of the hopper at right angles to the shaft 30. The other end of this shaft 35 is loosely connected with a shaft 37, which has near its other end a bevel-pinion 38, which meshes with the bevel-teeth on the ground-wheel 39. This wheel 39 is mounted on an axle 40, the ends of which are secured in suitable beams 41 41'. These beams are connected together at the top by means of a cross-beam 42, and the beam 41' and the standard or beam 1 are connected together by means of a cleat and bolts, as shown, or in any other suitable manner. The beams 41 41' are cut away at 42' to provide boxes or housings for springs 43. These springs tend to normally press the axle and wheel downward, but are sufficiently yielding to permit the wheel to ride over rough ground.

To keep the shaft 37 and pinion 38 from working loose from the teeth on ground-wheel 39, the end of said shaft is placed in a guideway 39$^a$, attached to the beam 41, which allows it ample room to move up and down with the wheel 39 when the latter is passing over rough ground.

The operation of my invention is as follows: The hopper having been filled with seed and the planter started the ground-wheel 39 will commence to revolve, imparting motion to the shaft 37, which in turn revolves the shaft 35, from whence motion is imparted to the shaft 30, and from the latter to the feed-plate 20, causing this plate and the separator and spreader to revolve together, the latter tending to agitate the seed and prevent their clogging. When one of the openings in the seed-plate 20 registers with the discharge-opening 22 in the bottom of the hopper, the seed will pass through and fall from the spout into the furrow and will be covered up by the covering-plows.

When it is desired to use the plow and planter for plowing alone, the covering-plows are raised so as to clear the ground and are then held in that position by means of the lever 13 and bail 14.

Having thus described my invention, what I claim as new, and desire to secure by Letters Patent, is—

1. In a combined plow and planter, the combination of the hopper 15, seed-plate 20 having its under side provided with bevel-teeth, the transverse shaft 30 carrying the pinions 32, 33, the pinion 32 meshing with the seed-plate, the longitudinal shaft 35 carrying the pinion 34 meshing with the pinion 33, the shaft 37 loosely connected at one end with the shaft 35, and having near its other end the pinion 38, and the ground-wheel 39 provided with bevel-teeth to engage the pinion on shaft 37, substantially as described.

2. In a combined plow and planter, the combination of the hopper, the seed-plate and spreader device having its periphery notched or formed with teeth, and provided with vertical arms 29, the vertical shaft 27 connecting the seed-plate and spreader, and means for imparting rotary motion to said plate and spreader device, substantially as described.

3. In a combined plow and planter, the standard 1, handles 2, plow 3, arms 4, pivotally attached to the handles 2, the downwardly-extending arms 6, pivotally attached to the arms 4, brace-rods 8 connecting the arms 4 and 6, and turn-shovels 7 attached to the downwardly-extending arms 6, in combination with means for raising and lowering said turn-shovels or plows, substantially as described.

4. In a combined plow and planter, the standard 1, handles 2, plow 3, arms 4, pivotally attached to the handles 2, the downwardly-extending arms 6, pivotally attached to the arms 4, brace-rods 8 connecting the arms 4 and 6, and turn-shovels or plows 7 attached to the downwardly-extending arms 6 in combination with means for raising and lowering said turn-shovels or plows, and means for holding them in a raised position, substantially as described.

5. The combination, in a combined plow and planter, with the standard 1, handles 2 and plow 3, the turn-shovels or covering-plows, and the rod 13 for raising and lowering them, of the hook or bail 14 attached to one of the handles 2 for engaging with the rod 13 and holding the plows or shovels 7 in a raised position, substantially as described.

6. In a combined plow and planter, the standard 1, handles 2, plow 3, arms 4 pivotally attached to the handles 2, the downwardly-extending arms 6, the braces or rods 8 connecting the arms 4 and 6 together, the turn-shovels or covering-plows attached to arms 6, in combination with the rod or shaft 9 having its ends bent downwardly as described, and engaging with the arms 4, and provided with the lever 13, and the locking device 14 for holding the lever 13 in a downward position, substantially as described.

In testimony whereof I affix my signature in presence of two witnesses.

GEORGE FRANKLIN.

Witnesses:
  L. E. CARTWRIGHT,
  C. P. HOBGOOD.